(12) United States Patent
Peterson et al.

(10) Patent No.: US 6,911,061 B2
(45) Date of Patent: Jun. 28, 2005

(54) IN-LINE HEPA FILTER

(75) Inventors: Michael D. Peterson, Parker, CO (US); Darold M. Popish, Golden, CO (US); Terry J. Wickland, Evergreen, CO (US); Craig Washburn, Highlands Ranch, CO (US)

(73) Assignee: Nuclear Filter Technology, Golden, CO (US)

( * ) Notice: Subject to any disclaimer, the term of this patent is extended or adjusted under 35 U.S.C. 154(b) by 95 days.

(21) Appl. No.: 10/234,136

(22) Filed: Sep. 5, 2002

(65) Prior Publication Data

US 2004/0045894 A1 Mar. 11, 2004

(51) Int. Cl.⁷ .............................................. B01D 46/52
(52) U.S. Cl. .............................. 55/380; 55/381; 55/521
(58) Field of Search .......................... 55/380, 382, 521, 55/525, DIG. 45; 210/487–491, 494.1, 494.2, 499, 459, 500.25, 461, 483, 484–485, 416.4, 416.5, 167–168, 446–447

(56) References Cited

U.S. PATENT DOCUMENTS

| | | | |
|---|---|---|---|
| 3,555,941 A | | 1/1971 | Takahashi |
| 3,872,576 A | | 3/1975 | Mott |
| 4,187,182 A | * | 2/1980 | Rosenberg .................. 210/445 |
| 4,277,256 A | | 7/1981 | Hesky et al. |
| 4,400,277 A | | 8/1983 | Leason |
| 4,435,194 A | | 3/1984 | Picard et al. |
| 4,442,003 A | | 4/1984 | Holt |
| 4,601,820 A | | 7/1986 | Leason |
| 4,725,411 A | * | 2/1988 | Cornelison .................. 422/180 |
| 4,863,591 A | | 9/1989 | Dionne |
| 5,114,447 A | | 5/1992 | Davis |
| 5,238,477 A | * | 8/1993 | Layton ........................ 55/497 |
| 5,368,633 A | | 11/1994 | Foldyna et al. |
| 5,487,771 A | | 1/1996 | Zeller |
| 5,772,883 A | | 6/1998 | Rothman et al. |
| 5,814,118 A | * | 9/1998 | Wickland et al. .......... 55/385.4 |
| 5,820,646 A | | 10/1998 | Gillingham et al. |
| 5,882,515 A | | 3/1999 | Lacy et al. |
| 5,917,066 A | | 6/1999 | Eisenmann et al. |
| 5,925,243 A | | 7/1999 | Clark et al. |
| 6,189,704 B1 | | 2/2001 | Dennehey et al. |
| 6,224,835 B1 | * | 5/2001 | Langer ........................ 422/179 |
| 6,280,619 B1 | | 8/2001 | Lacy et al. |
| 6,316,168 B1 | | 11/2001 | Butt et al. |
| 6,319,399 B1 | * | 11/2001 | Peterson et al. ............ 210/232 |
| 6,458,418 B2 | * | 10/2002 | Langer et al. ........... 427/376.1 |

OTHER PUBLICATIONS

DOE Stanadard, specification for HEPA Filters Used by DOE Contractors;DOE–STD–3020–97 Jan. 1997.

* cited by examiner

*Primary Examiner*—Terry K. Cecil
(74) *Attorney, Agent, or Firm*—Millen, White, Zelano & Branigan, P.C.

(57) ABSTRACT

A stainless steel filter assembly which filters fluid entering a fluid interactive device, such as a gas analyzer, includes a connection block in the line which has lateral ports for coupling with an inlet coupling and an outlet coupling on a filter. The filter has a folded filter media made of sintered stainless steel panels which are separated by stainless steel screens that increase the surface area of the filter media exposed to the inlet stream of fluid to be filtered.

13 Claims, 2 Drawing Sheets

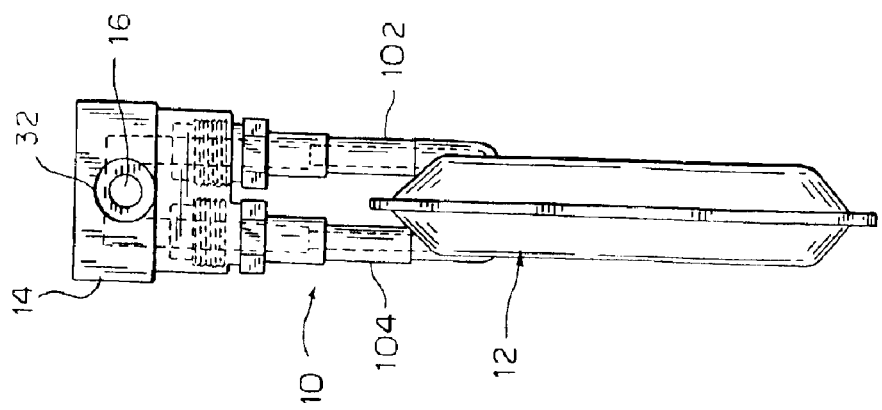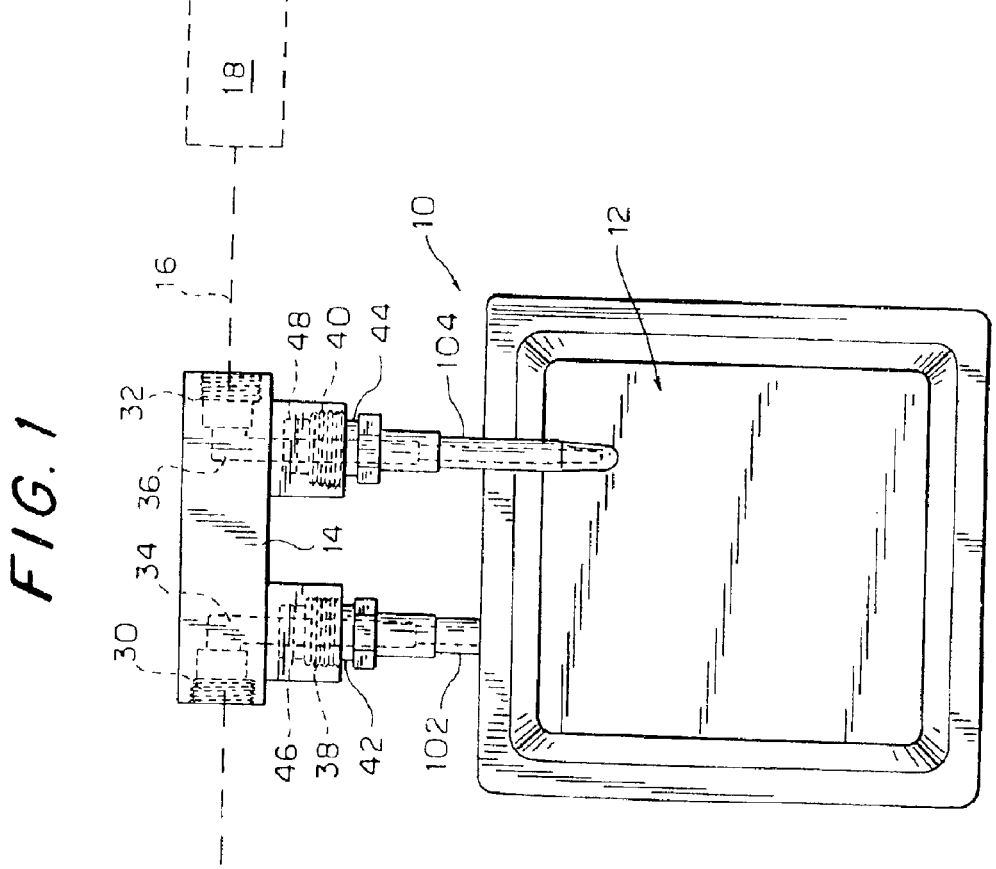

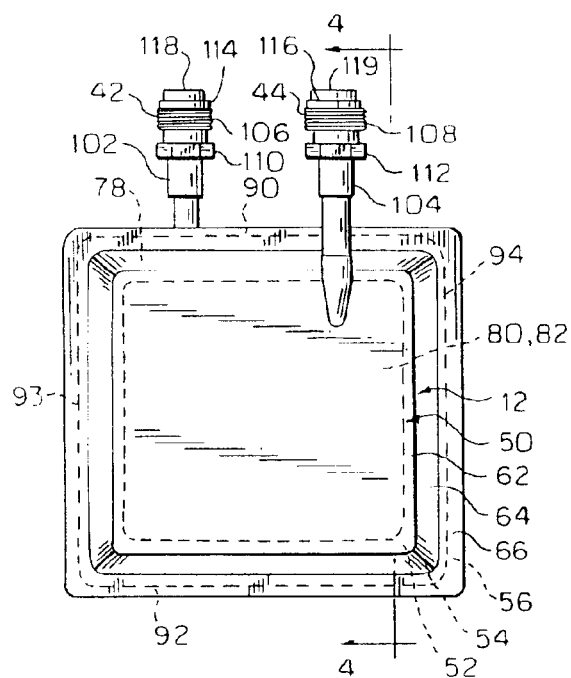
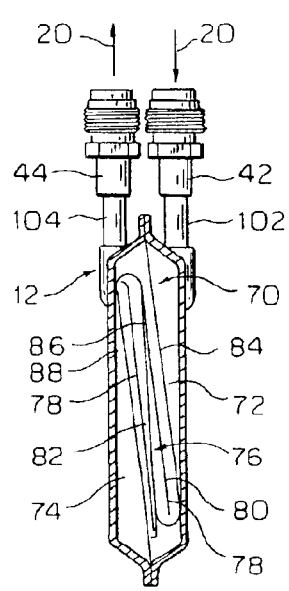
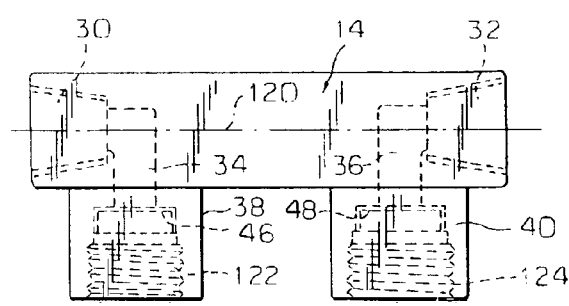
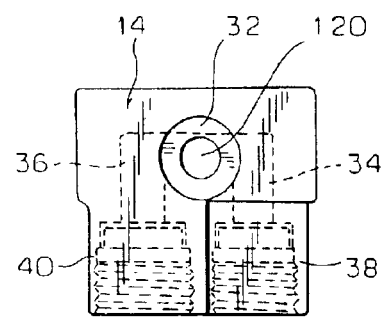

IN-LINE HEPA FILTER

The present invention is directed to an in-line HEPA filter. More particularly, the present invention is directed to an in-line HEPA filter for protecting a fluid interactive device such as, but not limited to, a gas analyzer.

Fluid interactive devices such as gas analyzers require removal of particulate contamination in order to function properly. When analyzing gases of all types including inert gases and air, it has been found that particulates having a diameter of less than about 0.3 microns are tolerable to downstream apparatus, but particulates greater than about 0.3 microns can cause devices such as gas analyzers to malfunction. It is also important that any devices, such as filters, used with devices such as gas analyzers do not themselves contaminate the gas streams. If a filter becomes clogged or is suspect in results obtained by an analysis, it is necessary to remove the filter. Currently available in-line filters are not convenient to remove because removal requires that the fluid intake line for the gas analyzer or other fluid interactive device be disconnected. This act in of itself may introduce particulate contamination.

A specific need for such a filter for gas analyzers is the nuclear waste disposal field wherein air and other gases from barrels or other containers of nuclear waste require analysis. If an analysis is taking place in a dirty environment, it is necessary to be able to change the filter as rapidly as possible with minimal disruption.

While gas analyzers are of immediate interest with respect to improving filter configurations, there is also a need for filtering aqueous solutions and other liquid solutions for various purposes with a readily replaceable in-line filter.

SUMMARY OF THE INVENTION

With the aforementioned considerations in mind, the present invention is directed to a filter for protecting a fluid interactive device from particulate contamination. The filter comprises a filter element including a stainless steel filter media arranged as a plurality of overlapping panels separated by stainless steel metal screening. The panels each have a downstream side and an upstream side. A stainless steel housing contains the filter element, the stainless steel housing having an upstream chamber and a downstream chamber separated from one another by the filter element. An inlet is fixed to the downstream chamber and an outlet connected to the upstream chamber with a first pair of couplings connected to the inlet and outlet. A connection block having an inlet port and an outlet port for connection in an inlet line of the fluid device is connected to the first pair of couplings.

A feature of the invention is to have all abutting surfaces and surfaces of the filter contacted by the fluid being filtered made of stainless steel.

In a further aspect of the invention, the housing is comprised of two stainless shells which have peripheral flanges that are welded together with peripheral portions of the filter media disposed therebetween.

In an additional aspect of the invention, the panels of the filter media are connected to provide a filter media folded from a continuous web having first and second ends and first and second edges which form peripheral portions of the filter media in contact with the inside surface of the housing.

In a particular aspect of the invention, the filter is used to protect a gas analyzer from particulate contamination.

Various other features and attendant advantages of the present invention will be more fully appreciated as the same becomes better understood when considered in conjunction with the accompanying drawings, in which like reference characters designate the same or similar parts throughout the several views, and wherein:

FIG. 1 is a side view of a filter assembly configured in accordance with the present invention;

FIG. 2 is an end view of filter assembly of FIG. 1;

FIG. 3 is side view of a filter used with a filter assembly of FIGS. 1 and 2;

FIG. 4 is end elevation taken along lines 4—4 of FIG. 3;

FIG. 5 is a side elevation of a connector block configured in accordance with the principles of the present invention; and FIG. 6 is an end view of the connector block of FIG. 5.

Referring now to FIGS. 1 and 2, there is shown a filter assembly 10 configured in accordance with the principles of the present invention wherein a filter 12 is connected by a connection block 14 in an inlet line 16 of a fluid interactive device illustrated generally by dotted lines 18. The fluid interactive device may be any device which receives a gas or liquid for analysis or some other purpose, wherein it is necessary to filter particulate matter from a stream 20 flowing through the inlet line 16, the connection block 14, the filter 12, back through the connection block 14 and then back over the inlet line 16 to the fluid interactive device 18. Examples of an interactive devices 18 which are used with the filter assembly 10 are gas analyzers which analyze practically any gas from inert gases to air. Gas analyzers are sensitive to particulate contamination. It has been found that particle sizes smaller than 0.3 microns generally do not interfere with their operation, but particle sizes of about 0.3 microns and larger do interfere with proper functioning. Accordingly, it is necessary to remove particles of about 0.3 microns and larger.

The filter assembly 10 is comprised of the filter 12 and the connecting block 14. Having the filter 12 connected laterally to the connection block 14 makes it substantially easier to change the filter 12 because the inlet line 16 to the fluid interactive device 18 does not have to be longitudinally separated to release the filter 12. This is accomplished by having threaded longitudinally opening ports 30 and 32 for connection to the inlet line 16, which longitudinally opening ports are connected by lateral bores 34 and 36 to an upstream threaded coupling port 38 and a downstream threaded coupling port 40. The upstream coupling port 38 is connected to upstream male filter coupling 42 extending from the filter 12 while the downstream filter coupling port 40 is connected to a downstream male filter coupling 44 on the filter 12. The upstream coupling 38 and 42 and downstream coupling 40 and 44 are metal to metal couplings using metal gaskets 46 and 48, respectively. In order to replace the filter 12 after the filter has become clogged or for some other reason, the threaded coupling ports 38 and 42 and the male filter couplings 40 and 44 are disconnected from one another so that the filter 12 may be detached laterally from the inlet line 16 and a new filter 12 mounted on the connection block 14.

In a preferred embodiment of the invention, all components of the filter assembly are made of stainless steel so that any surface of the filter assembly which comes into contact with the fluid stream passing therethrough is a stainless steel surface. It is within the scope of this invention to make the components with other materials and to line those materials with stainless steel, however it is preferable to fabricate all components of stainless steel.

Referring now to FIGS. 3 and 4 where the filter 12 is shown as a separate replaceable unit, it is seen that the filter 12 comprises a stainless steel filter housing 50 having a first shell 52 with a short outwardly slanted sidewall 54 and a peripheral flange 56. The first shell 52 faces a second shell 62 which has a short outwardly slanted sidewall 64 and a peripheral flange 66 to form the filter housing 50. Within the filter housing 50 there is a space 70 which is divided into an inlet chamber 72 and an outlet chamber 74 by a filter element 76. The filter element 76 is comprised of a filter media 78 which is folded back upon itself in a serpentine arrangement and two separator screens 80 and 82 disposed between panels 84 and 86 and panels 86 and 88 of the filter media 78 to keep the panels in spaced relation to one another. The stream of air 20 enters the inlet coupling 42 and passes sequentially through the first panel 84, the separator screen 80, the second panel 86, the spacer screen 82 and emerges through the third panel 88 into the outlet chamber 74. The spacer screens 80 and 82 keep the surface area of the filter media 78 exposed to fluid flowing into the inlet chamber 72 so as to increase the surface area exposed to fluid being filtered. After the fluid flows through the panel 88 and into the upstream chamber 74, it exits through the outlet tube to which the downstream male coupling 44 is attached.

The filter media 78 is made from a continuous web of sintered stainless steel which meets HEPA standards. The web of filter media 88 has end edges 90 and 92 and side edges 93 and 94, which edges are sandwiched between the peripheral flange 56 of the shell 52 forming the upstream portion of the filter housing 50 and the peripheral flange 66 on the shell 62 forming the downstream portion of the filter housing 50. Since the filter media 70 is folded over itself, the sides edges 93 and 94 are overlapped. In order to accommodate this overlap, the stainless steel filter screens 80 and 82 have a width less than the width of the filter media 78 and are retained therein in a bag-like fashion. Preferably, the lamination comprised of peripheral flanges 56 sandwiching the edge portions of the filter media 78 therebetween is welded using tungsten inert gas welding (TIG).

The inlet coupling 42 and the outlet coupling 44 are mounted on an inlet tube 102 and an outlet tube 104, respectively. The inlet and outlet tubes 102 and 104 communicate with the upstream chamber 72 and the downstream chamber 74, respectively. Coupling 42 has a threaded portion 106 while the coupling 44 has a threaded portion 108, the threaded portions 106 and 108 being unitary with hex nuts 110 and 112, respectively. Couplings 42 and 44 are slidably and rotatably mounted on the inlet and outlet tubes 102 and 104, respectively, and have ends 114 and 116 which bear against flanges 118 and 120, respectively, on the inlet and outlet tubes 102 and 104, respectively. Inlet and outlet tubes 102 and 104 have abutment surfaces 118 and 119 adapted for metal to metal contact with the seals 46 and 48 (see FIGS. 5 and 6) within the inlet and outlet ports 38 and 40 of the connection block 14.

Referring now to FIGS. 5 and 6 in combination with FIG. 1, it is seen that the threaded couplings 38 and 40 of the connection bock 14 are both longitudinally and laterally offset with respect to the axis 120 of the connection block 14. This facilitates quick access to the couplings 42 and 44 on the inlet and outlet tubes 102 and 104, respectively, extending from the filter housing 12. The female coupling 38 has an internal thread 122 which receive the external thread 106 of male coupling 42 while the female coupling 40 has an internal thread 124 which receive the external thread 108 of male coupling 44. Since the hex nuts 110 and 112 are rotated clockwise, the threaded connections advance the ends 118 and 119 of the tubes 104 and 102 toward and against the stainless steel seals 46 and 48. Upon tightening the engagement between the ends 118 and 119 against a metal seals 46 and 48, a fluid tight connection for both liquids and gases is established without the use of plastic or rubber. Preferably, the connection block 14 remains in the line 16 so only the filter 12 of the filter assembly 10 (FIG. 1) is removed and replaced.

The stainless steel couplings provided by the rotating inlet and outlet male couplings 42 and 44 and the threads 122 and 124, which urge the ends 118 and 119 into abutment with the metal gaskets 46 and 48, are known in the coupling art as VCR couplings. These couplings provide connections which allow the filter 12 to be used in high vacuum situations as well as pressurized systems.

From the foregoing description, one skilled in the art can easily ascertain the essential characteristics of this invention, and without departing form the spirit and scope thereof, can make various changes and modifications of the invention to adapt it to various usages and conditions.

We claim:

1. A gaseous filter for protecting a gas analyzer from particulate contamination, comprising:

a HEPA filter element comprising a stainless steel filter media arranged in a plurality of connected overlapping adjacent panels, the adjacent panels being separated by stainless steel metal screening forming a filter media support, the panels each having a downstream side and an upstream side;

a stainless steel housing containing the filter element, the housing having an upstream chamber and a downstream chamber separated from one another by the filter element the housing including first and second shells, each shell including a peripheral flange, the peripheral flanges being joined together with a peripheral edge of the filter media sandwiched therebetween;

a filter inlet fixed to the downstream chamber and a filter outlet connected to the upstream chamber;

a pair of couplings connected to the filter inlet and filter outlet, and a connection block having an inlet port and an outlet port not in communication with the inlet port, the ports being for connection in an inlet line of the gas analyzer, the connection block further having an inlet filter connection port and an outlet filter connection port opening laterally of the inlet and outlet ports, each having secondary coupling structures complementing the first pair of coupling structures, wherein gas must pass through the filter element to pass from the inlet port of the connection block when the filter is coupled to the connection block, whereby the filter is readily removable from the connection block by releasing the coupling structures.

2. The filter of claim 1 wherein the housing has abutting portions and the abutting portions, filter media support, couplings and connection block are made of stainless steel.

3. The filter of claim 2 wherein the abutting portions of the housing are comprised of two stainless steel shells which have peripheral flanges that are welded together with peripheral portions of the filter media therebetween.

4. The filter of claim 3 wherein the panels of the filter media are connected to provide a filter media folded from a continuous web having first and second ends and first and second edges which form peripheral portions of the filter media, the peripheral portions being in contact with the inside surface of the housing.

5. The filter of claim 4 wherein the filter media traps particles having a diameter of at least 0.3 microns.

6. The filter of claim 1 wherein the panels of the filter media are connected to provide a filter media folded from a continuous web having first and second ends and first and second edges which form peripheral portions of the filter media, the peripheral portions being in contact with the inside surface of the housing.

7. The filter of claim 1 wherein the pair of couplings have threaded male ends which thread into internally threaded walls of the inlet and outlet filter connection ports.

8. A filter for protecting a gas analyzer from particulate contamination, comprising:

a HEPA filter element comprising a filter media arranged in a plurality of connected overlapping panels, the adjacent panels being separated by metal screening forming a filter media support, the panels each having a downstream side and an upstream side;

a housing containing the filter element, the housing having an upstream chamber and a downstream chamber separated from one another by the filter element, the housing including first and second shells, each shell including a peripheral flange, the peripheral flange being joined together with a peripheral edge of the filter media sandwiched therebetween;

an inlet connected to the downstream chamber and an outlet connected to the upstream chamber;

a first pair of couplings connected to the inlet and outlet, and a connection block having an inlet port and an outlet port not in communication with the inlet port, the ports being for connection in an inlet line of the gas analyzer, the connection block further having an inlet filter connection port and an outlet filter connection port opening laterally of the inlet and outlet ports, each having secondary coupling structures complementing the first pair of coupling structures wherein gas must pass through the filter element to pass from the inlet port of the connection block when the filter is coupled to the connection block, whereby the filter is readily removable from the connection block by releasing the coupling structures while the connection block remains connected in the inlet line of the gas analyzer, and the housing, filter media support, couplings and connection block being made of stainless steel and the filter media being made of HEPA material.

9. The filter of claim 8 wherein the panels of the filter media connection to provide a filter media folded from a continuous web having first and second ends and first and second edges, which ends and edges are in contact with the inside surface of the housing.

10. The filter of claim 9 wherein the filter media traps particles having a diameter of at least 0.3 microns.

11. The filter of claim 10 wherein the filter media is made of sintered stainless steel.

12. The filter of claim 9 wherein the filter media is made of sintered stainless steel.

13. The filter of claim 8 wherein the filter media is made of sintered stainless steel.

* * * * *

UNITED STATES PATENT AND TRADEMARK OFFICE
CERTIFICATE OF CORRECTION

PATENT NO. : 6,911,061 B2
DATED : June 28, 2005
INVENTOR(S) : Peterson et al.

It is certified that error appears in the above-identified patent and that said Letters Patent is hereby corrected as shown below:

Column 4,
Line 32, after "element", insert -- ; --.

Signed and Sealed this

Thirtieth Day of August, 2005

JON W. DUDAS
*Director of the United States Patent and Trademark Office*